A. R. Fenner,
Saw-Set,

N° 50,463. Patented Oct. 17, 1865.

Witnesses
Wm Oreurw
Thos Fusch

Inventor:
A R Fenner
By Munn

UNITED STATES PATENT OFFICE.

A. R. FENNER, OF COLD BROOK, NEW YORK.

IMPROVEMENT IN SAW-SETS.

Specification forming part of Letters Patent No. 50,463, dated October 17, 1865.

*To all whom it may concern:*

Be it known that I, A. R. FENNER, of Cold Brook, in the county of Herkimer and State of New York, have invented a new and Improved Saw-Set; and I do hereby declare that the following is a full, clear, and exact description thereof, which will enable those skilled in the art to make and use the same, reference being had to the accompanying drawings, forming part of this specification, in which—

Figure 1:
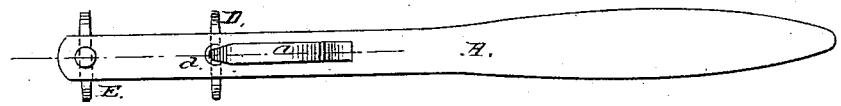
Figure 2:
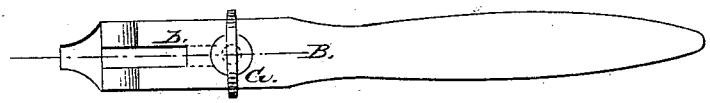
Figure 3:
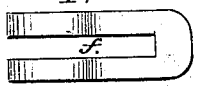
Figure 4:
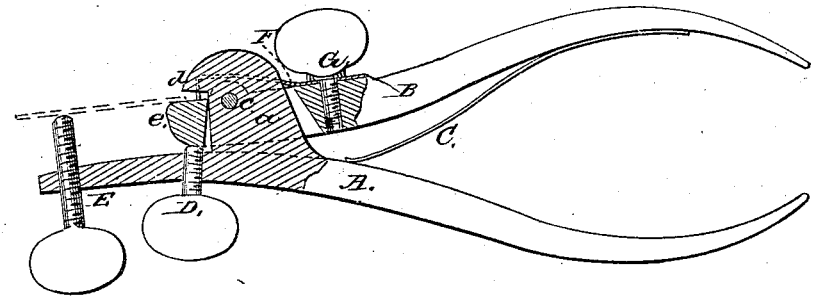

Figure 1 is a plan or top view of the lower jaw of my invention; Fig. 2, a plan or top view of the upper jaw of the same; Fig. 3, a detached view of a gage pertaining to the same; Fig. 4, a side sectional view of the whole device ready for use.

Similar letters of reference indicate corresponding parts.

This invention relates to a new and improved saw-set; and it consists in the employment or use of two jaws, gage-screws, and a gage, all arranged in such a manner as to admit of the saw being set in a true or even manner, regardless of the variation in the thickness of the saw-plate.

A represents the lower handle-bar of my saw-set, which is formed with a lip or projection, *a*, to pass through a slot, *b*, in the upper handle-bar, B, a pivot, *c*, passing through the lip *a* and upper jaw, on which the two handle-bars work as a fulcrum. The upper handle-bar has a spring, C, attached to it, which bears against the lower handle-bar, and has a tendency to keep the two handle-bars of the jaws distended, as will be fully understood by referring to Fig. 4. The upper jaw, *d*, is at the upper part of the lip *a*, as shown clearly in Fig. 4, and the lower jaw, *e*, is at the end of the handle-bar B.

The distension of the two jaws *d e* is regulated by a screw, D, which passes through the lower handle-bar, A, the upper handle-bar, B, bearing against it directly under its jaw end, as shown in Fig. 4.

E is a screw which passes through the lower handle-bar, A, at one end, and serves as a gage for the saw-plate, regulating the degree of set to be given the teeth; and F is a gage-plate constructed of a plate having a slot, *f*, made longitudinally in it to fit on the upper handle-bar, B, and allow the lip *a* to pass through. This plate F is secured at any desired point by a screw, G, and it has its outer end bent downward at each side of slot *f*, to prevent the saw-teeth being placed between the two jaws beyond a certain distance.

The saw-plate rests on the top of the screw E, as shown in red in Fig. 4, and the amount of set to be given the teeth is regulated by adjusting said screw; the gage-plate F insures the jaws grasping each tooth an equal distance, according to their length or size, the plate F being adjusted in accordance therewith.

If the saw plate or blade be of equal thickness throughout, each tooth will have an equal bend or the same angle; but if the plate or blade vary in thickness, the screw E will leave the plate or blade as the jaws *d e* are closed upon the thin tooth, and will give it a rather greater bend or angle, the increased bend compensating for the thinness of the tooth, and causing the saw-teeth to have a uniform set throughout.

The device is extremely simple and efficient, and may be used by any one at all conversant in such matters so as to give a perfect set to the teeth of a saw.

I am aware that J. D. Spiller obtained a patent on the 24th of February, 1857, for a saw-set somewhat analogous to mine in its general principles, but differing in the construction and arrangement of its parts, and consequently in its mode of operation.

I claim as new and desire to secure by Letters Patent—

The two handle-bars A B, pivoted together and provided with the two jaws *d e*, as shown, in connection with the screws E D, one or both, and gage-plate F, all constructed, arranged, and operating in the manner substantially as and for the purpose set forth.

A. R. FENNER.

Witnesses:
HENRY FENNER,
STEPHEN McLALLIN.